(12) United States Patent
Tracy et al.

(10) Patent No.: US 7,382,611 B2
(45) Date of Patent: Jun. 3, 2008

(54) CONNECTOR PROTECTION SYSTEM

(75) Inventors: Mark S. Tracy, Tomball, TX (US); Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 10/988,368

(22) Filed: Nov. 12, 2004

(65) Prior Publication Data

US 2006/0104018 A1    May 18, 2006

(51) Int. Cl.
G06F 1/16    (2006.01)

(52) U.S. Cl. .................. 361/686; 396/448; 439/136

(58) Field of Classification Search .............. 340/7.63; 396/448; 361/679–687, 724, 727; 439/136, 439/138; 174/67
See application file for complete search history.

(56) References Cited

U.S. PATENT DOCUMENTS 5,270,702 A * 12/1993 Krolak ...................... 340/7.63
5,701,232 A * 12/1997 Tang et al. .................. 361/683
6,079,881 A *  6/2000 Roth ............................ 385/76
6,123,557 A     9/2000 Wang et al.
6,264,488 B1    7/2001 Helot et al.
6,335,868 B1*  1/2002 Butterbaugh et al. ....... 361/796
6,341,555 B1    1/2002 Chang
2003/0227746 A1 12/2003 Sato
2004/0081449 A1*  4/2004 Westerweck et al. ....... 396/448
2004/0110402 A1  6/2004 Jones et al.
2005/0117249 A1*  6/2005 Spychalla ................ 360/98.04

FOREIGN PATENT DOCUMENTS

DE    20113039    1/2003
JP    11272359   * 10/1999

OTHER PUBLICATIONS

European Office Action dated Nov. 14, 2006, EPO App. No. 05 022 272.8-1527 (4 p.).

* cited by examiner

Primary Examiner—Hung Van Duong

(57) ABSTRACT

A connector protection system comprises a connector accessible through a surface, a door that moves substantially parallel to the surface, and a wedge feature that actuates movement of the door.

24 Claims, 9 Drawing Sheets

CONNECTOR PROTECTION SYSTEM

FIELD OF THE INVENTION

The present invention relates to portable electronic devices, and more particularly to the connection of a portable electronic device to a docking station.

BACKGROUND OF THE INVENTION

A "laptop" or "notebook" portable computer serves as an example of a portable electronic device that may be connected to a docking station. FIG. 1 shows a laptop computer 100, comprising a base portion 101 and a display portion 102, positioned in a docking station 103. A docking station, which may also be called a port replicator, enables improved functionality for computer 100 when the computer is connected to it. For example, docking station 103 may be kept at a computer user's office, and may enable connection of devices to computer 100 that make computer 100 more useful or comfortable to use, but that are typically not used with the computer when the user is away from the office and portability of computer 100 is of prime importance. For example, docking station 103 may enable connection of a full-size keyboard, a mouse, a conventional display, additional storage, a network, or other items. (The additional devices and connections have been omitted from FIG. 1 for clarity.) Portable computer 100 may comprise batteries that enable remote operation, and docking station 103 may also enable connection of computer 100 to a source of power for extended operation and for charging the batteries.

FIG. 2 shows computer 100 poised to connect to docking station 103. In FIG. 2, display portion 102 has been rotated to a closed position near base portion 101. In order to accomplish the connection, computer 100 comprises a docking connector 201 on a bottom surface 203 of computer 100, and docking station 103 comprises a mating connector 202. Docking connector 201 and mating connector 202 further comprise multiple individual contacts that pass multiple signals between the two devices.

If docking connector 201 is left exposed, computer 100 may be susceptible to damage. For example, docking connector 201 may be mechanically damaged during the rigors of portable use of computer 100. Additionally, docking connector 201 may provide a conduction path for electrostatic charge to reach and damage sensitive internal components of computer 100.

Prior solutions to this problem have had shortcomings. For example, in one prior solution, a removable plug is provided for sealing the opening that exposes the docking connector in the shell of a computer when the docking connector is not in use. The plug may be easily lost. FIG. 3 depicts a portable computer 300 comprising second prior solution. Computer 300 comprises spring-loaded swinging doors 301 that protect a docking connector 302. Doors 301 are held by springs in a protective closed position when no mating connector is present, but swing away when a mating connector is inserted, allowing the mating connector to engage docking connector 302. However, in order to provide sufficient clearance to enable operation of doors 301, connector 302 must be recessed deeply inside computer 300. This can constrain the design of computer 300 so that it is thicker than is desired.

There is a need for a convenient docking connector protection that enables sleek design of a portable electronic device.

SUMMARY OF THE INVENTION

A connector protection system comprises a connector accessible through a surface, a door that moves substantially parallel to the surface, and a wedge feature that actuates movement of the door.

DETAILED DESCRIPTION

Figure 1:
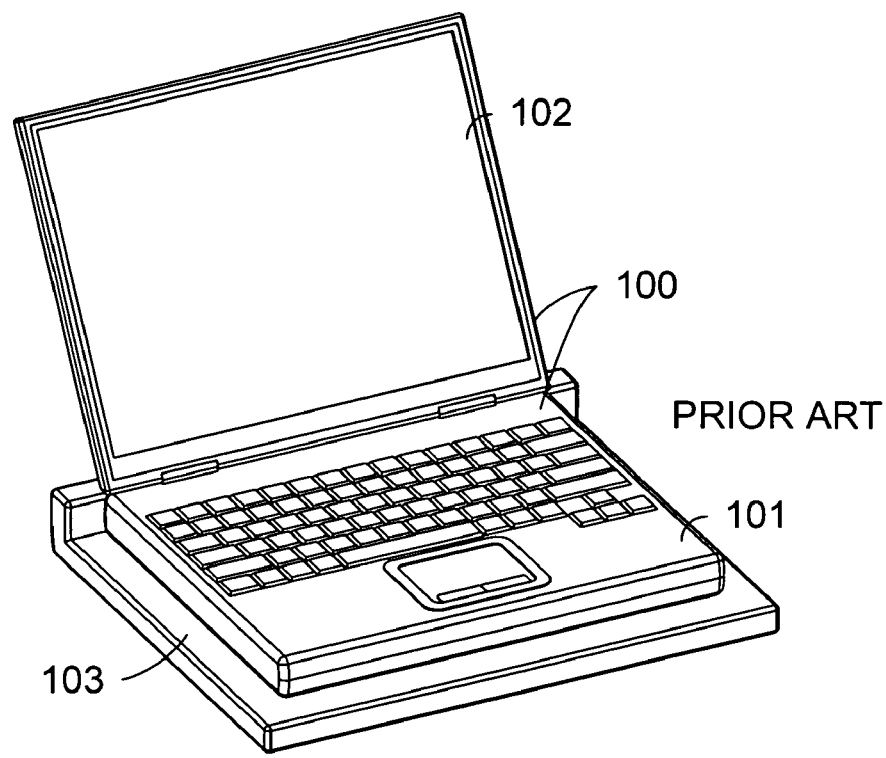
FIG. 1 shows a laptop computer positioned in a docking station.
Figure 2:
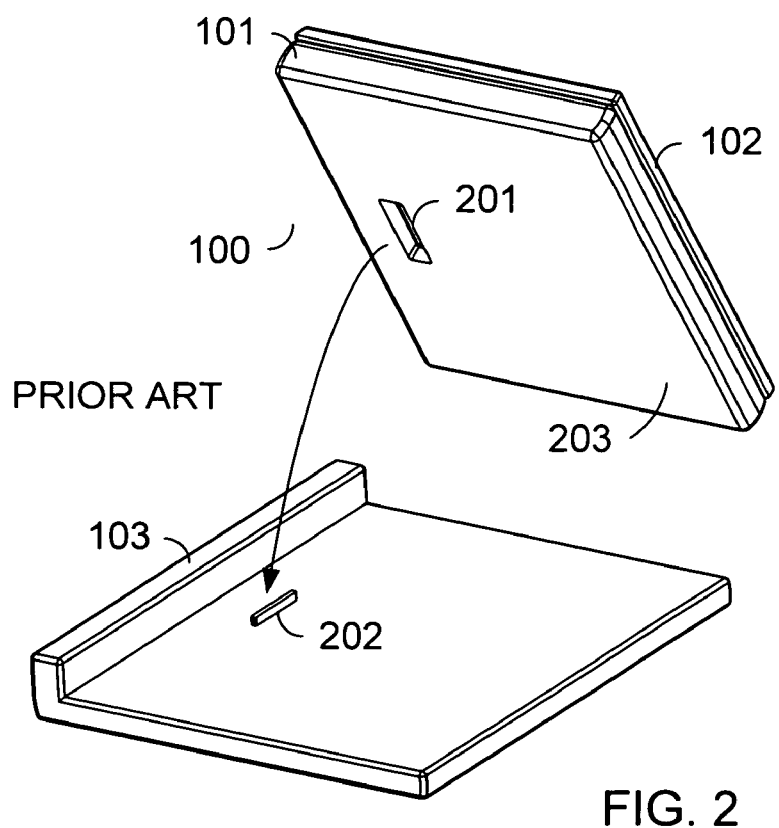
FIG. 2 shows the computer of FIG. 1, poised to connect to the docking station.
Figure 3:
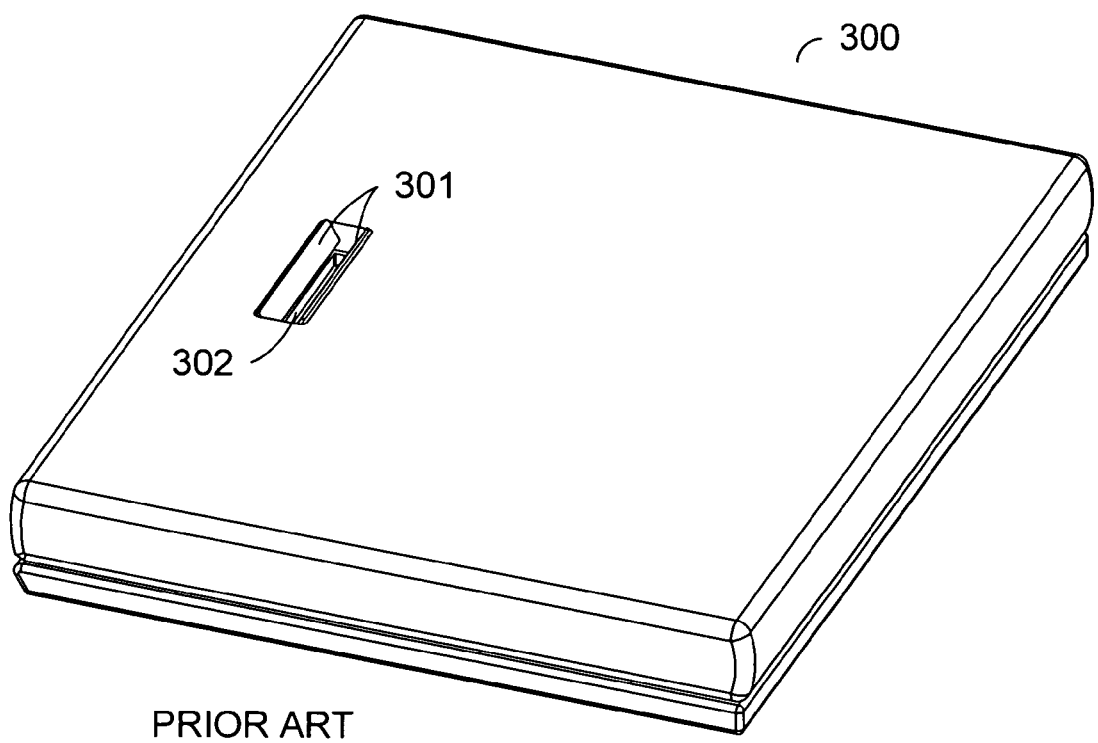
FIG. 3 depicts a prior art portable computer.
Figure 4A:
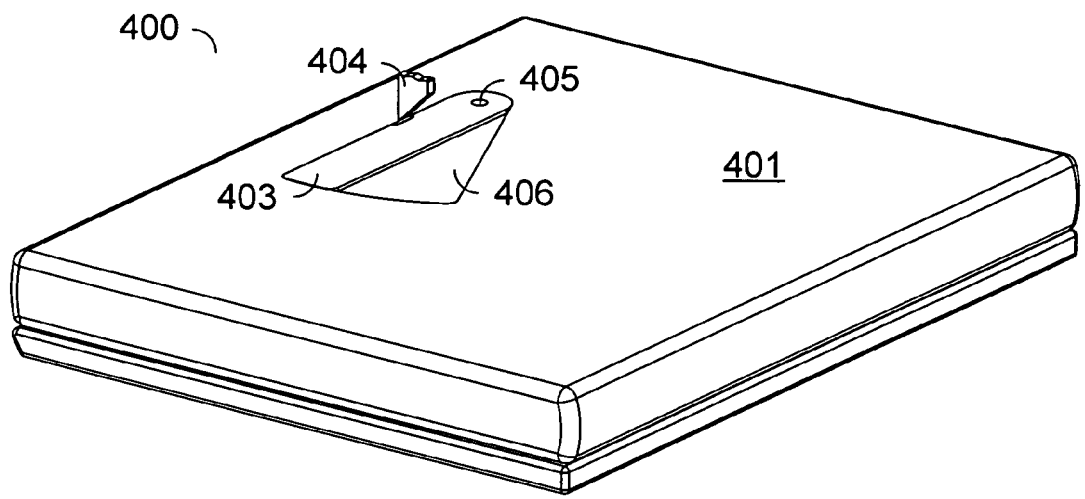
FIGS. 4A and 4B depict a portable computer comprising part of a connector protection system in accordance with a first example embodiment of the invention.
Figure 4B:
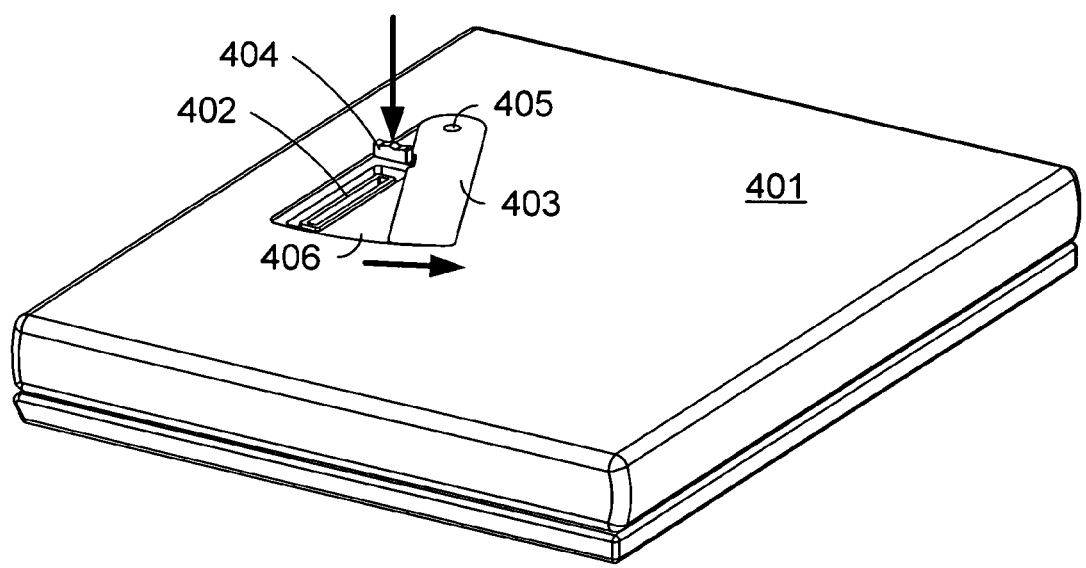

FIGS. 4A and 4B depict a portable computer 400 comprising part of a connector protection system in accordance with a first example embodiment of the invention. Computer 400 is shown with its bottom surface 401 upward. A connector 402 is accessible through bottom surface 401. A different surface may be used as well. The system comprises a relatively thin, generally planar door 403. In FIG. 4A, door 403 is in a closed position that covers connector 402, protecting it and computer 400 from damage. In FIG. 4B, door 403 has moved to an open position that exposes connector 402, enabling access by a mating connector. The motion of door 403 is substantially parallel to surface 401. That is, at both positions shown and during the motion between, door 403 remains substantially parallel to surface 401. Because door 403 is relatively thin, little of the interior space of computer 400 is taken up by door 403. Connector 402 can thus be positioned relatively closely to surface 401, allowing a designer of computer 400 additional freedom in positioning internal components, and enabling a thin, sleek computer design.

The motion of door 403 is actuated by wedge feature 404. When computer 400 and wedge feature 404 are positioned so that wedge feature 404 engages door 403, and then moved in relation to each other such that wedge feature 404 enters a cavity provided for it in computer 400, wedge feature 404 drives the motion of door 403 as depicted. In this example embodiment, the motion of door 403 is rotational, about a pivot 405. Pivot 405 may be an axle that protrudes into computer 400 and is journaled in a hole in the case of computer 400. The axle may be integrally formed with the generally planar portion of door 403. For example, door 403 and the axle may be comprised in a single part formed by plastic injection molding. Alternatively, door 403 may be made of a suitable metal, such as stainless steel, and an axle may be attached by staking, welding, or by other means. Other materials and fabrication methods may be used as well. For the purposes of this disclosure, door 403 is considered to be generally planar even if it comprises an axle or other guiding feature that protrudes from a small area of its generally planar main portion.

While a generally planar door and surface are shown in this example embodiment, it is not necessary that either the surface through which the connector is accessible or the door be generally planar. For example, a connector may be accessible through a generally cylindrical surface, and a generally cylindrical door may be actuated by a wedge feature. Cylindrical motion of a generally cylindrical door may be considered generally parallel to a cylindrical surface.

Door 403 may reside in a recess 406 formed in surface 401. Because door 403 is relatively thin, recess 406 does not protrude significantly into the interior of computer 400. For example, door 403 may be approximately 1.5 millimeters thick, and recess 406 may be a comparable distance in depth.

Figure 5:
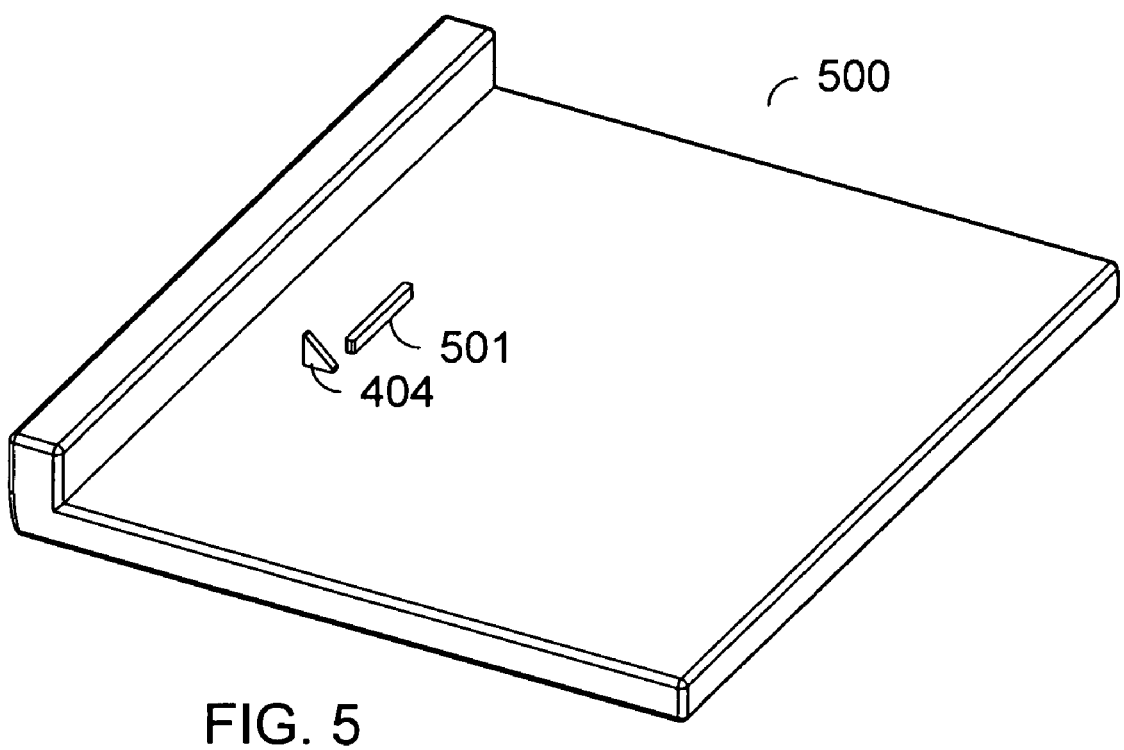
FIG. 5 depicts a docking station comprising part of a connector protection system in accordance with a first example embodiment of the invention.

In this example embodiment, wedge feature 404 is comprised in a docking station. FIG. 5 depicts a docking station 500 comprising part of a connector protection system in accordance with this first example embodiment of the invention. Docking station 500 comprises a mating connector 501, configured to engage docking connector 402. Docking station 500 also comprises wedge feature 404 in fixed relationship with mating connector 501. When computer 400 is positioned so that connector 402 is poised to engage mating connector 501, wedge feature 404 is poised to engage door 403. As computer 400 and docking station 500 are moved together, wedge 404 actuates door 403, exposing docking connector 402 and enabling its engagement with mating connector 501.

Figure 6A:
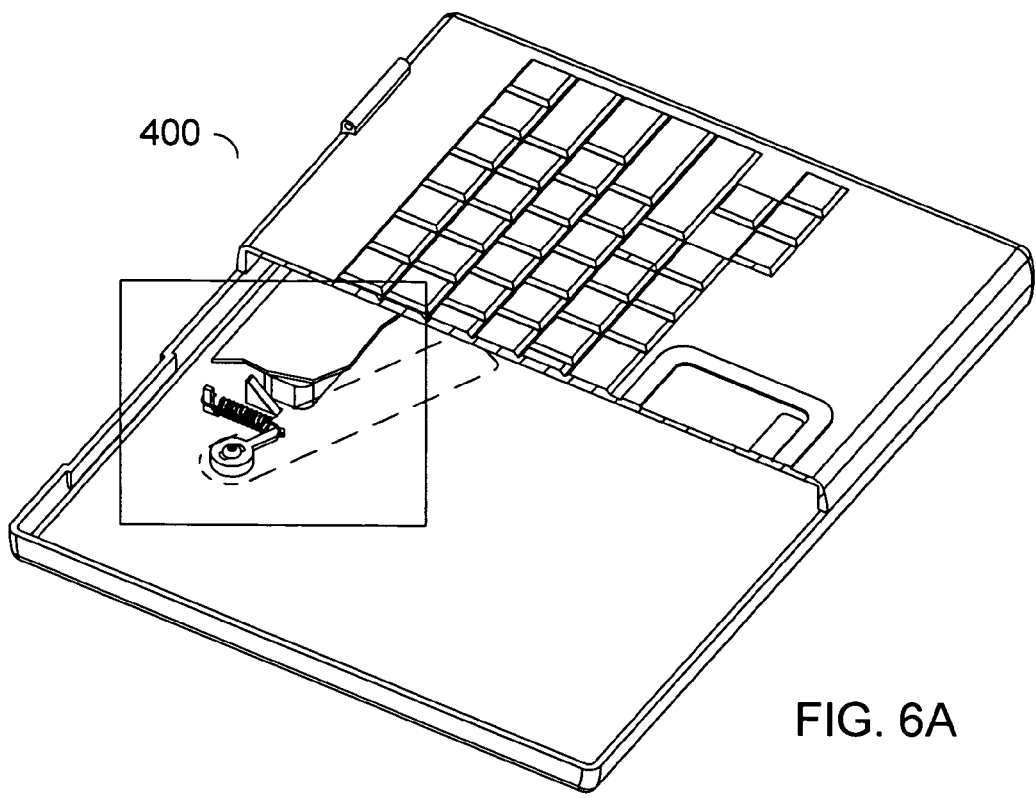
FIGS. 6A and 6B show a cutaway top perspective view of the computer of FIGS. 4A and 4B, with several internal components removed.
Figure 6B:
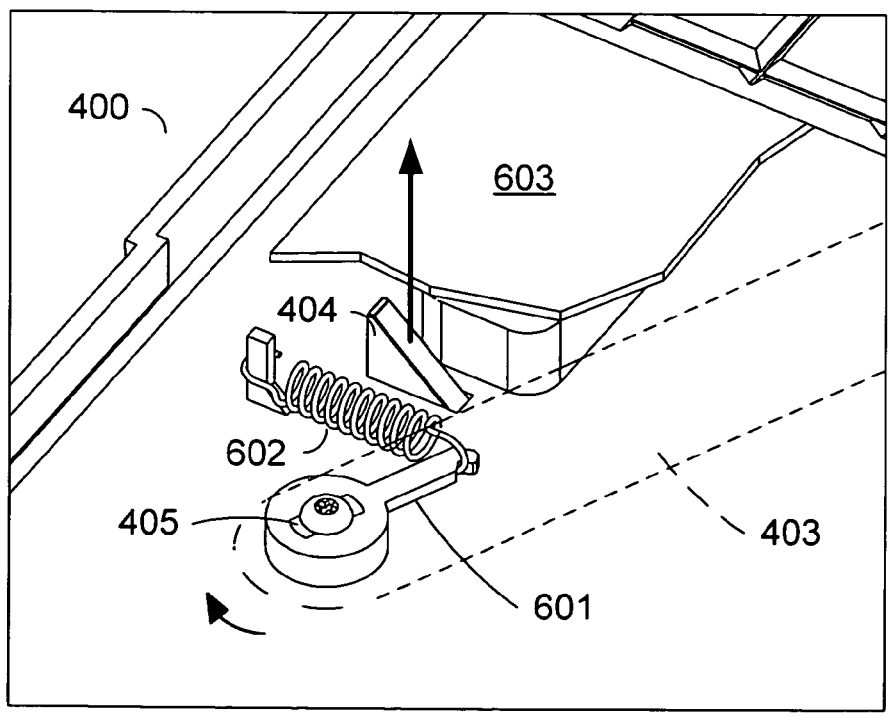

In this example embodiment, when computer 400 and docking station 500 are disengaged, door 403 is held in its closed position by a spring. For example, FIGS. 6A and 6B show a cutaway top perspective view of computer 400, with several internal components of computer 400 removed so that the details of the example connector protection mechanism are more readily visible. FIG. 6B shows a detail view of the indicated part of FIG. 6A.

As depicted in FIG. 6B, wedge 404 has moved door 403 into its open position. Door 403 has rotated about pivot 405. Lever 601 attached to pivot 405 rotates in concert with door 403. The motion is resisted by extension spring 602.

When computer 400 and docking station 500 are disengaged and wedge 404 is withdrawn, extension spring 602 draws door 403 back to its closed position. Connector 402 is not visible in FIGS. 6A and 6B, but is attached to circuit board 603.

Figure 7A:
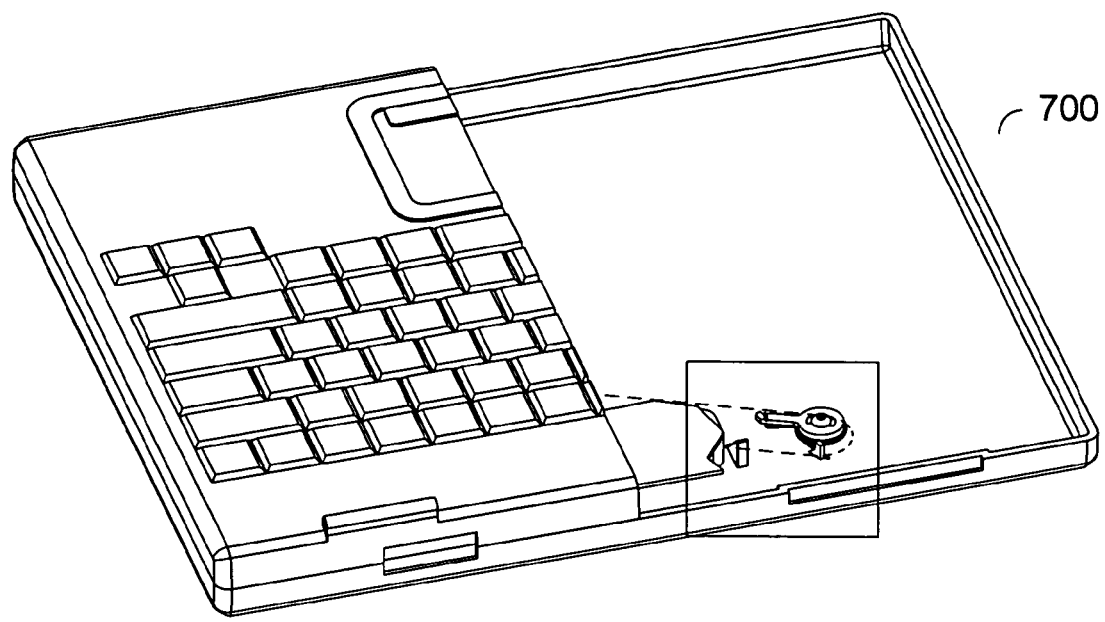
FIGS. 7A and 7B show, in a cutaway top perspective view, a computer comprising a portion of a connector protection mechanism in accordance with a second example embodiment of the invention.
Figure 7B:
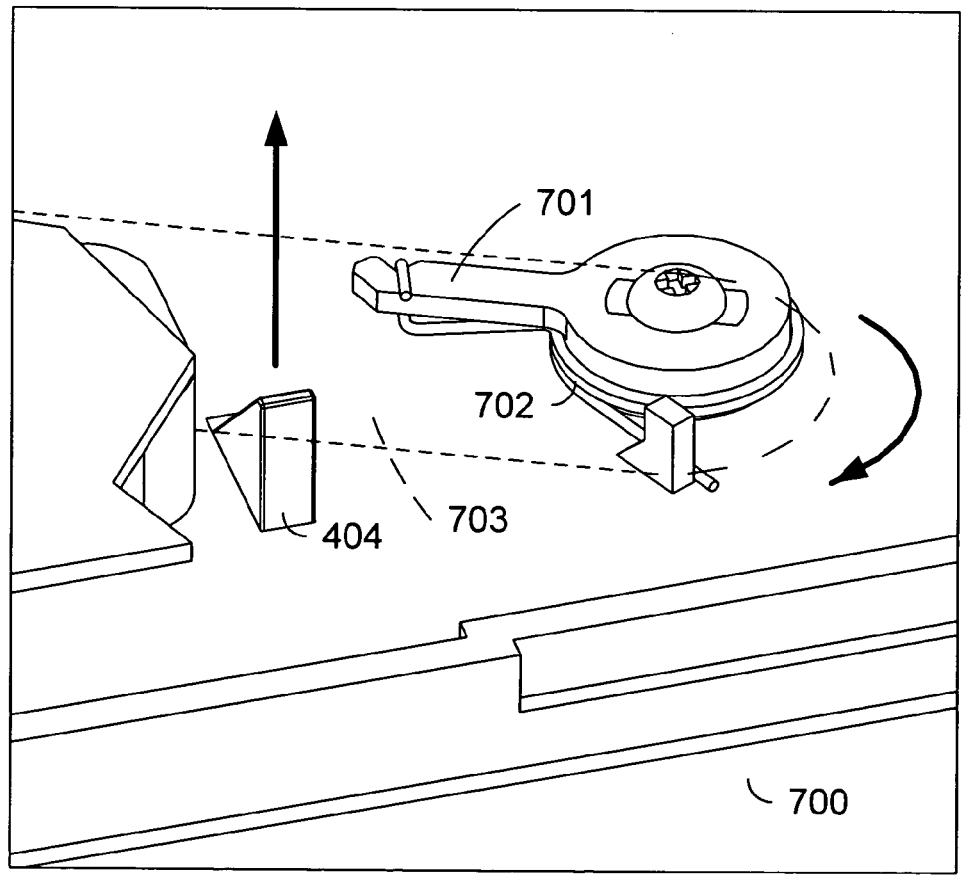

FIGS. 7A and 7B show, in a cutaway top perspective view, a computer 700 comprising a portion of a connector protection mechanism in accordance with a second example embodiment of the invention. FIG. 7B shows a detail view of the indicated part of FIG. 7A. Many of the internal components of computer 700 have been removed from the figures for clarity. When computer 700 is disengaged from a docking station such as docking station 500, a torsion spring 702 holds door 703 in a closed position. As wedge 404 actuates door 703 toward its open position, lever 701 rotates in concert with door 703, while torsion spring 702 resists the motion. When computer 700 and docking station 500 are disengaged, torsion spring 702 moves door 703 back to its closed position.

Figure 8A:
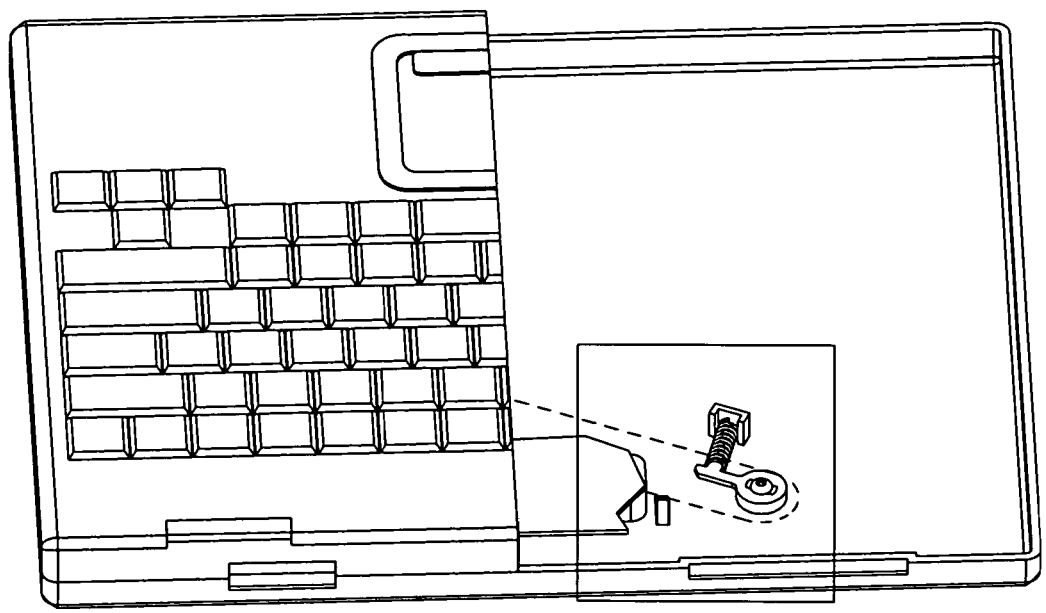
FIGS. 8A and 8B show, in a cutaway top perspective view, a computer comprising a portion of a connector protection mechanism in accordance with a third example embodiment of the invention.
Figure 8B:
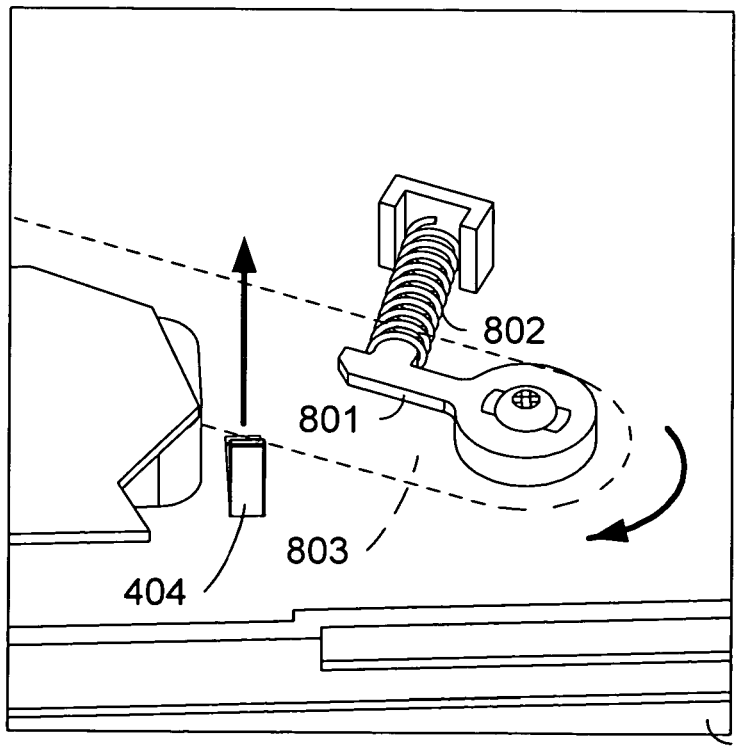

FIGS. 8A and 8B show, in a cutaway top perspective view, a computer 800 comprising a portion of a connector protection mechanism in accordance with a third example embodiment of the invention. FIG. 8B shows a detail view of the indicated part of FIG. 8A. Many internal components of computer 800 have been removed from the figures for clarity. When computer 800 is disengaged from a docking station such as docking station 500, a compression spring 802 holds door 803 in a closed position. As wedge 404 actuates door 803 toward its open position, lever 801 rotates in concert with door 803, while compression spring 802 resists the motion. When computer 800 and docking station 500 are disengaged, compression spring 802 moves door 803 back to its closed position.

Figure 9A:
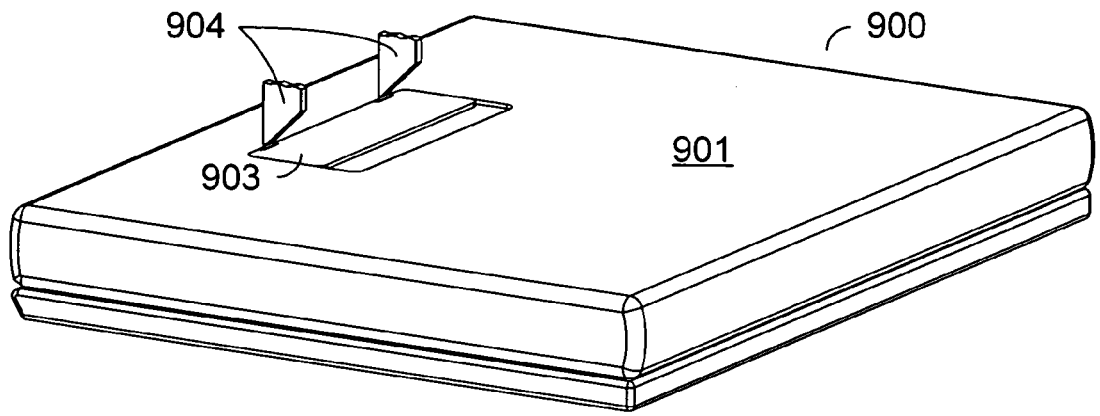
FIGS. 9A and 9B depict a portable computer comprising part of a connector protection system in accordance with a fourth example embodiment of the invention.
Figure 9B:
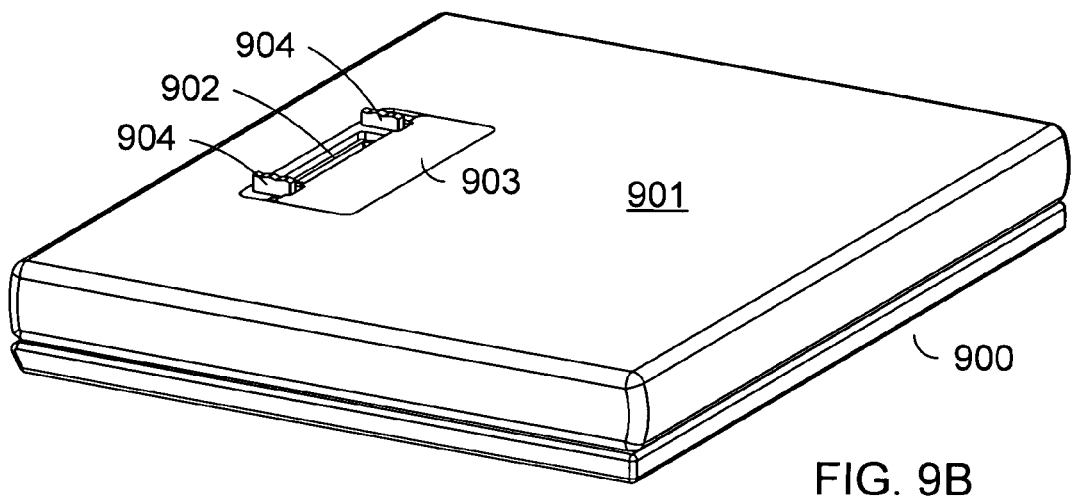

FIGS. 9A and 9B depict a portable computer 900 comprising part of a connector protection system in accordance with a fourth example embodiment of the invention. A door 903 protects docking connector 902 when computer 900 is not engaged with a docking station. When computer 900 is engaged with a docking station, wedges 904 actuate door 903 to expose docking connector 902, enabling its engagement with a mating connector on a docking station. In this example system, the motion of door 903 is generally parallel to the bottom surface 901 of computer 900, and is translational, rather than rotational. That is, door 903 does not rotate with respect to the rest of computer 900 during its opening motion.

Figure 10:
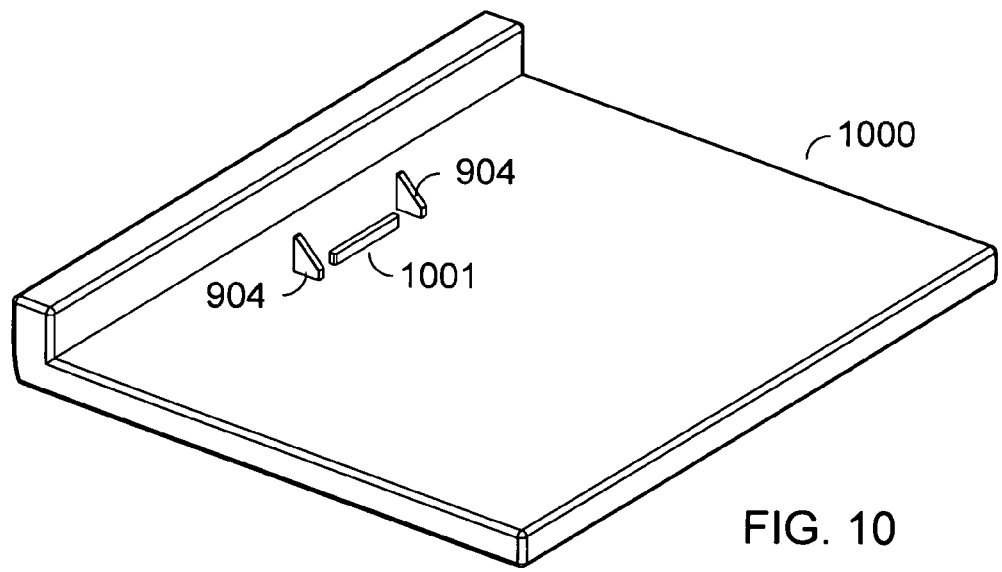
FIG. 10 depicts a docking station in accordance with a fourth example embodiment of the invention.

FIG. 10 depicts a docking station 1000 in accordance with this fourth example embodiment of the invention. Docking station 1000 comprises a mating connector 1001 configured to engage with docking connector 902 on computer 900. Docking station 1000 further comprises two wedge features 904 in fixed relationship with mating connector 1001. When computer 900 is positioned so that connector 902 is poised to engage mating connector 1001, wedge features 904 are poised to engage door 903. As computer 900 and docking station 1000 a removed together, wedge features 904 actuate door 903, exposing docking connector 902 and enabling its engagement with mating connector 1001.

Figure 11A:
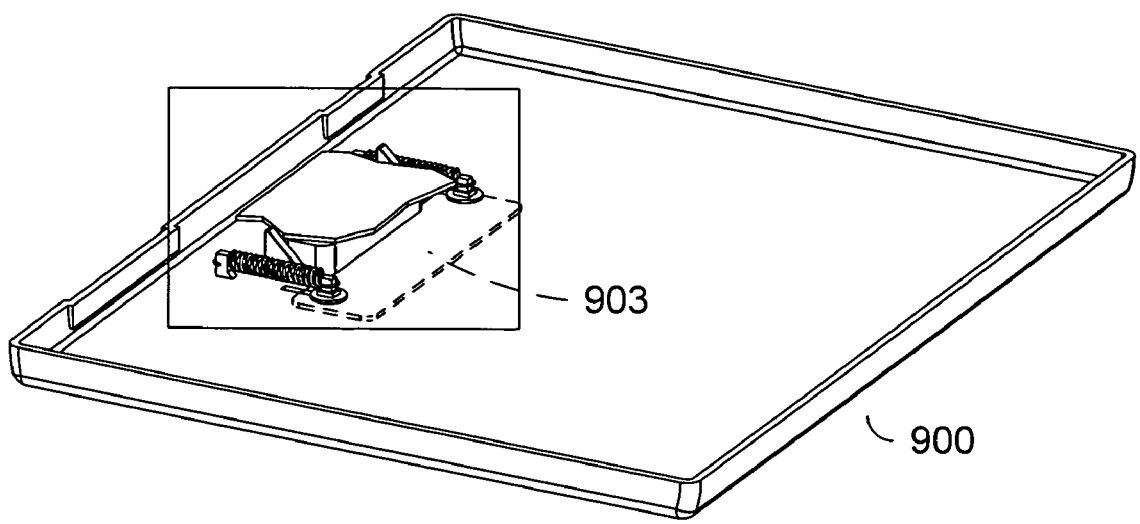
FIGS. 11A and 11B show a top perspective view of some internal components of the computer of FIGS. 9A and 9B.
Figure 11B:
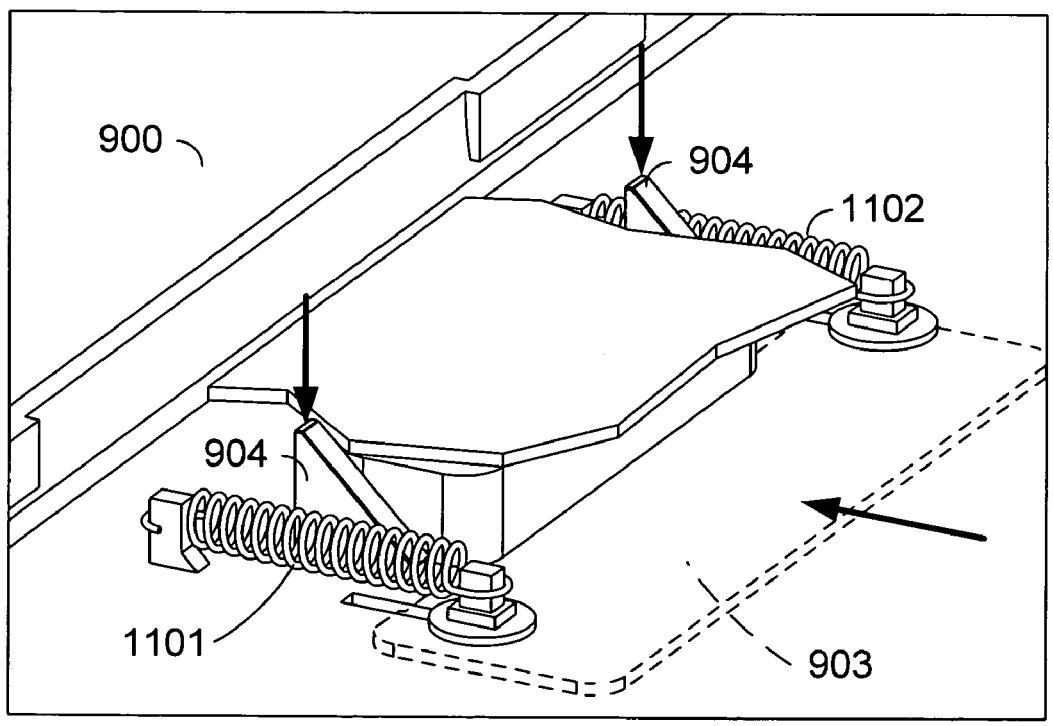

FIGS. 11A and 11B show a top perspective view of some internal components of computer 900. FIG. 11B shows a detail view of the indicated part of FIG. 11A. Many internal components of computer 900 have been removed from the figures for clarity. When computer 900 is disengaged from a docking station such as docking station 1000, two springs 1101 and 1102 hold door 903 in a closed position. As wedge features 904 actuate door 903 toward its open position, springs 1101 and 1102 resist the translational motion. When computer 900 and docking station 1000 are disengaged, springs 1101 and 1102 move door 903 back to its closed position.

While the example embodiments described thus far have used a portable computer as the example electronic device, other devices may be used as well. For example, the invention may be embodied in a system comprising a personal digital assistant (PDA). A PDA is a portable device, often handheld and carried with its user, that stores information for ready retrieval and use. For example, a user may store addresses and telephone numbers of people that are frequently contacted, digital books for convenient reading at any location, digital photographs, or even digital music that can be played when desired. A PDA may be placed in a docking station for synchronization with a computer, for battery charging, or in order to connect peripheral devices such as a full-size keyboard.

Similarly, the invention may be embodied in a system comprising a tablet computer. A tablet computer is typically a relatively flat, thin computer with a relatively large screen on one face. The screen may function both as a display and as an input device, enabling a user of the computer to enter data into the computer by simply "writing" on the screen with a stylus. A tablet computer may be placed in a docking station for synchronization with another computer, for charging of batteries, or for connecting peripheral devices.

The invention claimed is:

1. A connector protection system, comprising:
   a connector accessible through a surface;
   a movable door that moves rotationally and substantially parallel to the surface between a closed position and an open position, the open position exposing the connector; and
   a wedge feature that actuates movement of the door.

2. The connector protection system of claim 1, wherein the door is generally planar.

3. The connector protection system of claim 1, further comprising a spring that resists an opening motion of the door.

4. The connector protection system of claim 3, wherein the spring is an extension spring.

5. The connector protection system of claim 3, wherein the spring is a torsion spring.

6. The connector protection system of claim 3, wherein the spring is a compression spring.

7. The connector protection system of claim 1, wherein the surface is a surface of an electronic device.

8. The connector protection system of claim 7, wherein the electronic device is a portable computer.

9. The connector protection system of claim 7, wherein the electronic device is a tablet computer.

10. The connector protection system of claim 7, wherein the electronic device is a personal digital assistant.

11. The connector protection system of claim 1, wherein the connector is a docking connector comprised in an electronic device, and the wedge feature is comprised in a docking station, the docking station further comprising a mating connector configured to engage with the docking connector.

12. The connector protection system of claim 11, wherein a motion that engages the docking connector and the mating connector also causes the wedge feature to actuate motion of the door.

13. An electronic device, comprising:
    a connector accessible through a surface of the electronic device, the electronic device being at least one selected from the group consisting of: a portable computer, a tablet computer, and a personal digital assistant; and
    a movable door that moves substantially parallel to the surface between a closed position and an open position, the open position exposing the connector; and
    wherein the door is configured to be actuated by a wedge feature comprised in a docking station.

14. The electronic device of claim 13, further comprising a spring that resists an opening motion of the door.

15. The electronic device of claim 14, wherein the spring is an extension spring.

16. The electronic device of claim 14, wherein the spring is a torsion spring.

17. The electronic device of claim 14, wherein the spring is a compression spring.

18. The electronic device of claim 13, wherein the connector is a docking connector and is configured to engage with a mating connector comprised in the docking station.

19. The electronic device of claim 18, wherein a motion that engages the docking connector and the mating connector also causes the wedge feature to actuation the door motion.

20. The electronic device of claim 13, wherein the door is generally planar.

21. The electronic device of claim 13, wherein the door motion is rotational.

22. The electronic device of claim 13, wherein the door motion is translational.

23. A system comprising:
    a docking station for an electronic device, comprising:
        a mating connector configured to engage a docking connector comprised in the electronic device;
        a wedge feature in fixed relation to the mating connector, and configured to actuate motion of a door comprised in the electronic device, the motion of the door being generally parallel to a surface of the electronic device through which the docking connector is accessed.

24. The docking station of claim 23, wherein a motion that engages the docking connector and the mating connector also causes the wedge feature to actuate the door motion.

* * * * *

UNITED STATES PATENT AND TRADEMARK OFFICE
CERTIFICATE OF CORRECTION

PATENT NO. : 7,382,611 B2  Page 1 of 1
APPLICATION NO. : 10/988368
DATED : June 3, 2008
INVENTOR(S) : Mark S. Tracy et al.

It is certified that error appears in the above-identified patent and that said Letters Patent is hereby corrected as shown below:

In column 4, line 42, delete "a removed" and insert -- are moved --, therefor.

Signed and Sealed this

Seventeenth Day of March, 2009

JOHN DOLL
*Acting Director of the United States Patent and Trademark Office*